United States Patent
Tsukihashi

(10) Patent No.: US 7,000,134 B2
(45) Date of Patent: Feb. 14, 2006

(54) CONTROLLING THE MAXIMUM ROTATION SPEED OF A DISK DRIVE DEVICE BASED ON THE PRESENCE OF AN EXTERNAL POWER SOURCE AND THE POSSIBILITY OF A BUFFER UNDERRUN

(75) Inventor: Akira Tsukihashi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 640 days.

(21) Appl. No.: 10/151,034

(22) Filed: May 17, 2002

(65) Prior Publication Data

US 2002/0171980 A1 Nov. 21, 2002

(30) Foreign Application Priority Data

May 18, 2001 (JP) .................................... 2001-149411

(51) Int. Cl.
G06F 1/32 (2006.01)

(52) U.S. Cl. .................. 713/340; 713/300; 713/320
(58) Field of Classification Search ............. 713/300, 713/320, 322, 340; 369/47.36, 47.5; 360/73.01, 360/99.08
See application file for complete search history.

(56) References Cited

U.S. PATENT DOCUMENTS

| | | | | |
|---|---|---|---|---|
| 6,353,894 B1 | * | 3/2002 | Pione | 713/340 |
| 6,538,962 B1 | * | 3/2003 | Hyun | 369/30.23 |
| 6,622,252 B1 | * | 9/2003 | Klaassen et al. | 713/320 |
| 6,665,810 B1 | * | 12/2003 | Sakai | 713/600 |
| 6,735,671 B1 | * | 5/2004 | Kida | 711/111 |

* cited by examiner

Primary Examiner—Remana Perveen
Assistant Examiner—Paul Yanchus, III
(74) Attorney, Agent, or Firm—Hogan & Hartson, LLP

(57) ABSTRACT

At the time of data recording onto a disk, when an external power source connection detecting circuit (12) detects that connection of an external power source is released, the currently set rotation speed is recognized. When the current rotation speed cannot be achieved in a maximum speed restricting mode, the processing speed is switched to the maximum speed that can be achieved in the maximum speed restricting mode. At the time of data reproduction on a disk, when the external power source connection detecting circuit (12) detects that the connecting power source is switched to the external power source, the processing speed is automatically switched to the maximum disk rotation speed regardless of the maximum speed restricting mode.

19 Claims, 4 Drawing Sheets

CONTROLLING THE MAXIMUM ROTATION SPEED OF A DISK DRIVE DEVICE BASED ON THE PRESENCE OF AN EXTERNAL POWER SOURCE AND THE POSSIBILITY OF A BUFFER UNDERRUN

BACKGROUND OF THE INVENTION

1. Field of the Invention

The present invention relates to a disk drive device to which power can be supplied from an interface and an external power source, and relates, for example, to a disk drive device suitable for a device with a USB (Universal Serial Bus) interface.

2. Description of Related Art

CD-R (Recordable) drives and CD-RW (Rewritable) drives of the CD family, which are disk drive devices capable of recording, have been widely introduced as removable storage devices for a personal computers.

In these disk drive devices, attempts have been made to increase the rotation speed of a disk. For recording, CD-Rs are currently capable of high speed recording at 16 or more times the standard speed, and CD-RWs are capable of high speed recording at 8 or 10 times the standard speed.

The USB (Universal Serial Bus) standard is a known interface standard for connecting peripherals to a personal computer. USB interfaces are provided with a power supply line, and many of the stand-alone type disk drive devices adopt such USB interfaces.

The current USB standard is USB 2.0, but USB 1.1, the previous standard, remains supported.

The USB 2.0 standard allows data transfer at 480 Mbps, while the USB 1.1 standard allows data transfer at a rate of up to 12 Mbps. Accordingly, with USB 1.1, data transfer is limited to a speed up to approximately 6 times the rated rotation speed of a disk. With USB 2.0, on the other hand, the disk rotation speed is not practically restricted by the data transfer rate.

In order to increase the data transfer rate of disk drive devices, not only the disk rotation speed, but also the processing speed of a data processor, a response of a servo circuit, and an access speed must be increased. Consequently, when the data transfer rate is increased, power consumption in substantially all circuits, including a disk servo circuit, a data processing circuit, a laser drive circuit, and a head servo circuit of an optical head, also increases.

Accordingly, there is a problem that under current conditions, even for a disk drive device compatible with USB 2.0, sufficient power cannot be supplied to the drive device through the USB interface, and thus attempts to increase the speed of the disk drive device are restricted by the power supply ability of the USB interface.

Therefore, in order to achieve high speed operation of the disk drive device, external power supply through an AC adaptor or the like is required. In other words, high speed disk drive devices can only be achieved when power is supplied from an external power source.

However, it is also necessary to consider the possibility that use of an external power source may not be appropriate in situations where power supply from the external power source is not possible or where use of a cable for connection to the external power source is undesirable, such as when the cable would be unsightly or on obstruction.

SUMMARY OF THE INVENTION

The present invention was conceived in view of the above-described problems of the related art and aims to provide a disk drive device capable of achieving both high speed data transfer and suppressed power consumption when an external power source is not used, in a case where power supply from the interface is insufficient for an increased data transfer rate.

According to the present invention, in a case where, in data recording onto a disk, the rotation speed of the disk corresponds to a data transfer rate at which power supply from the interface is insufficient, when the external power source is disconnected, the rotation speed of the disk is switched to the maximum speed corresponding to the data transfer rate for which the power supplied through the interface is sufficient for the data processing, thereby avoiding a power shortage situation.

Further, in data reproduction on the disk, when the connecting power source is switched to the external power source so that power shortage will not occur even when data processing is performed at the maximum disk rotation speed, the data processing speed is automatically switched to the maximum disk rotation speed, thereby permitting maximum speed reproduction performance.

BRIEF DESCRIPTION OF THE DRAWINGS

These and other advantages of the invention will be explained in the description below, in connection with the accompanying drawings, in which.

DETAILED DESCRIPTION OF THE PREFERRED EMBODIMENT

Figure 1:
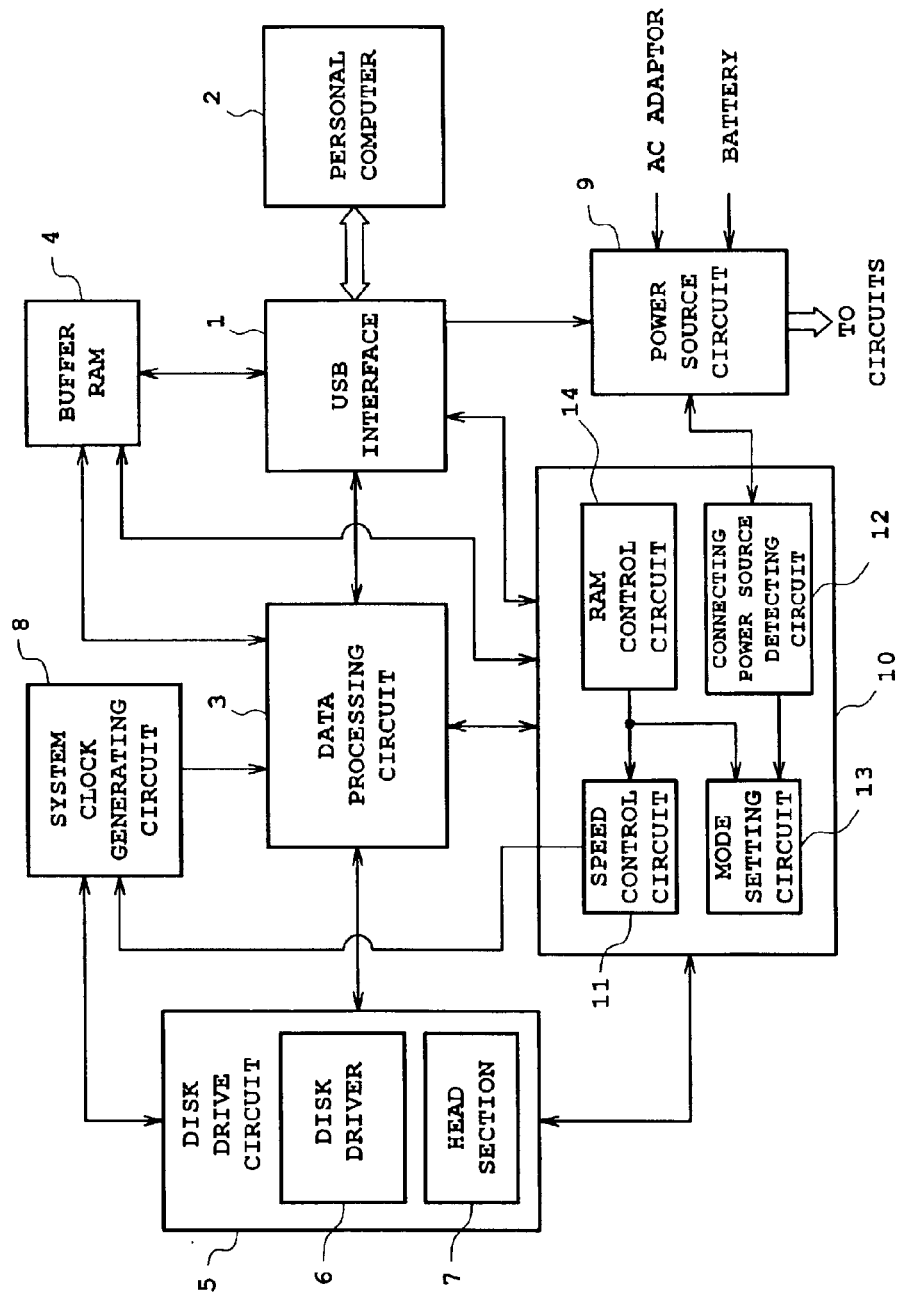
FIG. 1 is a diagram showing a structure of a disk drive device according to one embodiment of the present invention.

FIG. 1 illustrates a structure of a disk drive device according to one embodiment of the present invention.

Referring to FIG. 1, a USB interface 1 controls data reception and transmission to and from a personal computer 2 which serves as a host device. A data processing circuit 3 encodes data supplied from the personal computer 2 to create recording data in the form suitable for recording onto a disk. The data processing circuit 3 also decodes the recording data which is read from the disk. Data input and output through the interface 1 is stored in the buffer RAM 4 which is also used in data processing by means of the data processing circuit 3. A disk drive section 5 includes a disk driver 6 for driving a disk and a head section 7 for driving and controlling an optical head which performs data write and read to and from the disk. An operation clock corresponding to the data transfer rate is supplied by a system clock generation circuit 8 to each circuit. Power is supplied from the AC adaptor, a battery, and the interface 1 to a power source circuit 9, which then generates and supplies various output power to various circuits. A system control circuit 10 performs general control of the system regarding data recording and reproduction.

The system control circuit 10 includes a speed control circuit 11 for controlling the disk actuation section 6 to control the rotation speed of the disk, making the various operation clocks generated from the system clock generating circuit 8 correspond to the disk rotation speed, and controlling the various circuits including the data processing circuit 3 and the interface 1 to operate in accordance with the speed which is set; a connecting power source detecting circuit 12 for detecting the connection of the external power source which is the AC adaptor; a mode setting circuit 13 for selectively setting, in accordance with the detection output from the connecting power source detecting circuit 12, a maximum speed enabling mode in which the maximum disk rotation speed employable by the personal computer is not restricted and a maximum speed restricting mode in which the maximum disk rotation speed is restricted; and a RAM control circuit 14 for controlling data write and data read to and from the buffer RAM 4 and for generating a detection output indicating that buffer underrun is to occur in the buffer RAM 4. Buffer underrun occurs when the speed at which data is transferred from the personal computer 2 cannot keep up with the speed at which data is read from the buffer RAM.

It is preferable that the system control circuit 10 is constituted by a microcomputer. It is therefore preferable that various signals to be input to the system control circuit 10 are in a digital data form. However, when an analog signal is to be input, the analog signal can be converted into digital data using an A/D converter before subsequent processing. Further, when the system control circuit 10 is implemented by a microcomputer, the speed control circuit 11, the connecting power source detection circuit 12, the mode setting circuit 13, and the RAM control circuit 14 are implemented as functions performed by the microcomputer. Alternatively, the system control circuit 10 may be constituted by hardware.

In the disk drive device having the above structure, when a command requesting data write onto the disk is input from the personal computer 2 to the system control circuit 10 via the interface 1, the system control circuit 10 controls each of the various circuits and mechanisms so that each enters a recording condition for performing data recording onto a disk.

In this recording condition, file data corresponding to the writing request is transmitted from the personal computer 2 via the interface 1 and is then written in the buffer RAM 4. The data is then supplied to the data processing circuit 3 where an error detection code and an error correction code are added to the data, the resultant data is subjected to a modulation process in accordance with a disk medium (CD), a synchronization signal is further added to the modulated data, and the processed data is then encoded into recording data in a form suitable for recording onto the disk. The recording data thus processed is sequentially supplied to the disk drive section 5 and is then written onto the disk via the head section 7.

On the other hand, when a command requesting data read is input from the personal computer 2 to the system control circuit 10 via the interface 1, the system control circuit 10 controls each of the various circuits and mechanisms so that each enters a reproduction condition for reproducing data stored on a disk.

In this reproduction condition, a signal corresponding to the data which is requested to be read is read from the disk by means of the optical head of the head section 7. The signal thus read is then supplied to the data processing circuit 3 where a demodulation process in accordance with a disk medium is performed so that the data is separated into various signals. The data in the various signals is then subjected to error detection and error correction, is stored in the buffer RAM 4 as necessary, and is then transmitted to the personal computer 2 via the interface 1.

The disk drive device according to the present invention is capable of high speed recording and high speed reproduction. Specifically, reproduction at a high speed corresponding to the data transfer rate which is up to several tens times faster, e.g., 40 times faster, than the rated rotation speed of a disk can be performed. For CD-R, recording at a high speed corresponding to the data transfer rate which is, for example, 20 times that of the rated rotation speed of a disk can be performed, and for CD-RW recording at a high speed corresponding to the data transfer rate which is, for example, 10 times that of the rated rotation speed of a disk can be performed.

Further, the USB interface 1 in the disk drive device corresponds to USB 2.0. Therefore, the interface 1 permits a sufficiently high data transfer rate, which will not restrict the disk rotation speed for high speed recording and high speed reproduction.

However, when an AC adaptor is not connected, the disk rotation speed for high speed recording and high speed reproduction is restricted because of power consumption requirements.

Accordingly, the disk drive device shown in FIG. 1 is provided with the mode setting circuit 13 to select a mode for setting the maximum rotation speed of a disk for high speed recording and high speed reproduction in accordance with the detection output from the connecting power source detecting circuit 12.

Figure 2:
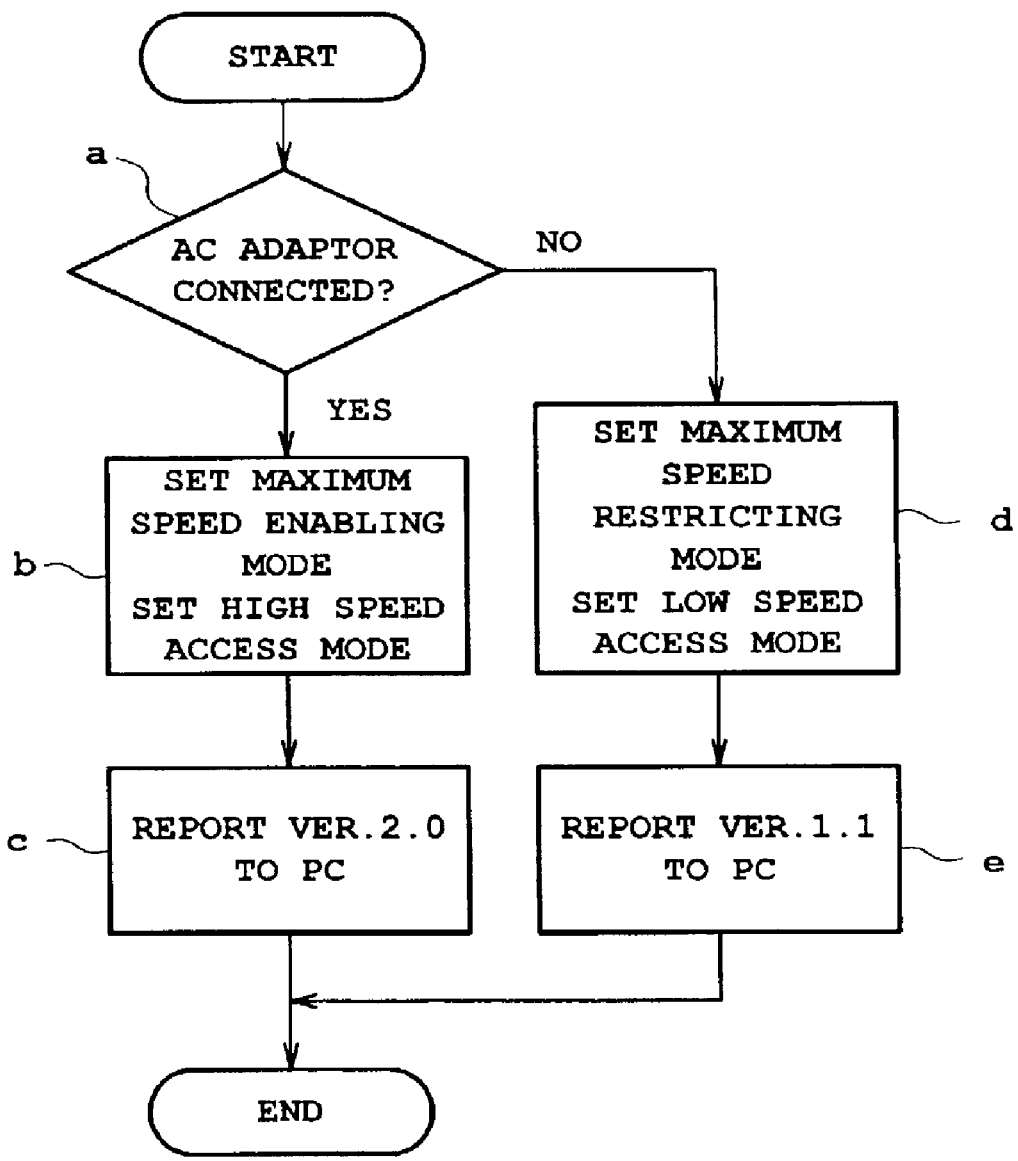
FIG. 2 is a flowchart for explaining a mode setting operation in the disk drive device shown in FIG. 1.

In this mode setting, operations are performed based on the flow chart shown in FIG. 2. The mode setting operations will be described with reference to FIG. 2.

After the power source of the disk drive device is turned on or the disk drive device is reset, during the startup operation of the disk drive device, the connecting power source detecting circuit 12 detects the connection state of the power source circuit 9 to determine whether or not an AC adaptor is connected to the power source circuit 9 (step a).

When it is determined that an AC adaptor is connected, the mode setting circuit 13 establishes a maximum speed enabling mode in which setting of the maximum speed is not restricted, and simultaneously establishes a high speed access mode for the access control to be performed by the access control circuit 14 which permits high speed access corresponding to the maximum speed enabling mode (step b). In other words, high speed access which conforms to the maximum speed enabling mode is enabled for data recording onto a disk and data reading from the disk by means of the head section 7.

Also, when an AC adaptor is connected, the fact that the disk drive device adopts the USB 2.0 standard is reported to the personal computer 2 (step c). Thus, the personal computer 2 recognizes that the disk drive device connected thereto is USB 2.0 compatible.

Consequently, the personal computer 2 operates based on the version of USB adopted, so that data recording and data reproduction can be set at any speed enabled by the disk drive device without restricting the maximum disk rotation speed for high speed recording and high speed reproduction which can be achieved by the personal computer 2.

In this manner, the disk drive device becomes capable of performing data recording and data reproduction at any enabled speed without restriction of the maximum disk rotation speed.

Here, in the high speed access control mode, it is possible to perform high speed thread transfer to achieve the maximum access performance.

Further, the personal computer is ready to issue a command corresponding to USB 2.0.

On the other hand, at step a, if it is determined that an AC adaptor is not connected, the mode setting circuit 13 establishes the maximum speed restricting mode in which the maximum speed which can be set is restricted. Simultaneously, the access control circuit 14 sets low speed access control mode which conforms with the established maximum speed restricting mode (step d).

Further, when an AC adaptor is not connected, the fact that the USB 1.1 standard is adopted is reported to the personal computer 2 (step e). Consequently, the personal computer 2 recognizes that the disk drive device connected thereto is compatible with USB 1.1.

Consequently, the personal computer 2 operates based on the version of USB adopted, so that the maximum disk rotation speed for high speed recording and high speed reproduction by the personal computer 2 is restricted to a speed which is no more than 6 times that of the rated speed, corresponding to the data transfer rate of USB 1.1. In other words, the disk drive device is now capable of data recording and reproduction only at a speed no more than the 6× speed.

In this manner, the disk drive device becomes capable of performing data recording and data reproduction at the maximum disk rotation speed restricted to a speed which is no more than 6 times that of the rated rotation speed.

Further, the personal computer 2 is prepared to issue a command corresponding to USB 1.1.

As a result, power requirements of the disk drive device can be reduced so that the power from the interface or the battery can be sufficient.

Figure 3:
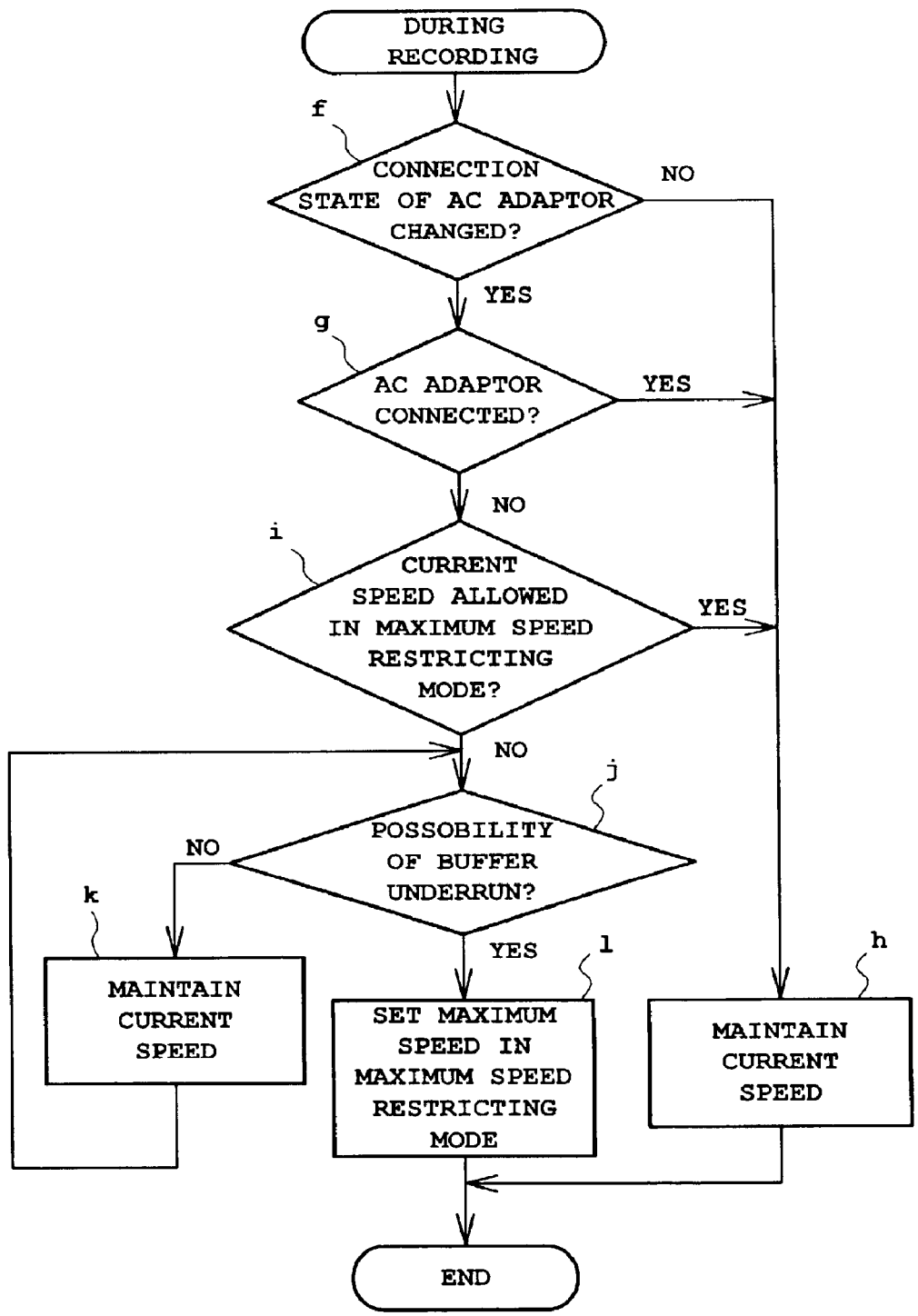
FIG. 3 is a flowchart for explaining an operation process when connection condition of an external power source in the form of an AC adaptor changes during data recording.

A case where the connection condition of the AC adaptor, which is an external power source, is changed during data recording will be described with reference to the flowchart shown in FIG. 3.

During data recording, the connecting power source detecting circuit 12 detects the connection state of the power source circuit 9 to determine whether or not the connection condition is changed (step f). When a change in the connection condition of the AC adaptor is detected, it is then determined whether or not the AC adaptor is connected (step g).

From the above two determination steps, it is determined that the power source is switched from the interface 1 or the battery to the AC adaptor, or vice versa.

When the power source is switched from the interface 1 or the battery to the AC adaptor, and when the connection condition of the AC adaptor is not changed, the current processing speed is maintained (step h).

On the other hand, when it is determined that the power source is switched from the AC adaptor to the interface 1 or the battery, it is further determined whether or not the currently set speed can be achieved in the maximum speed restricting mode (step i).

When the current rotation speed (the rotation speed at that point) can be achieved in the maximum speed restricting mode, the current speed is maintained (step h). When, on the other hand, the current disk rotation speed is a speed too high to be achieved in the maximum speed restricting mode, it is determined whether or not there is a possibility that buffer underrun will occur in the buffer RAM 4 because the speed at which data is transferred from the personal computer 2 cannot keep up with the speed at which data is read from the buffer RAM 4 for data writing onto the disk (step j).

The current speed is maintained until the possibility of buffer underrun is detected (step k). When the possibility of buffer underrun is detected and data recording onto the disk is to be interrupted, the current disk rotation speed is automatically switched to the maximum speed that can be achieved by the maximum speed restricting mode. Simultaneously, the fact that the disk rotation speed is switched to the maximum speed in the maximum speed restricting mode is reported to the personal computer 2, which now operates in accordance with the speed (step l).

Accordingly, during data recording onto the disk, in a case where data transfer is being performed at a disk rotation speed so high that power supply from the interface 1 is insufficient and connection of the AC adaptor is released, the disk rotation speed is switched to the highest speed in the maximum speed restricting mode at which sufficient power for the data processing can be supplied from the interface 1, thereby avoiding a power shortage and preventing failure of the data recording.

Here, the rotation speed of the disk is switched at the moment when buffer underrun is about to occur in the buffer RAM 4. Namely, in a disk drive device in which recording is interrupted by a buffer underrun and the recording is resumed after this interruption, data recording onto the disk is interrupted at the time of changing the data transfer rate and therefore recording is not performed in a state where various operations are not stable because of changing the transfer rate.

Figure 4:
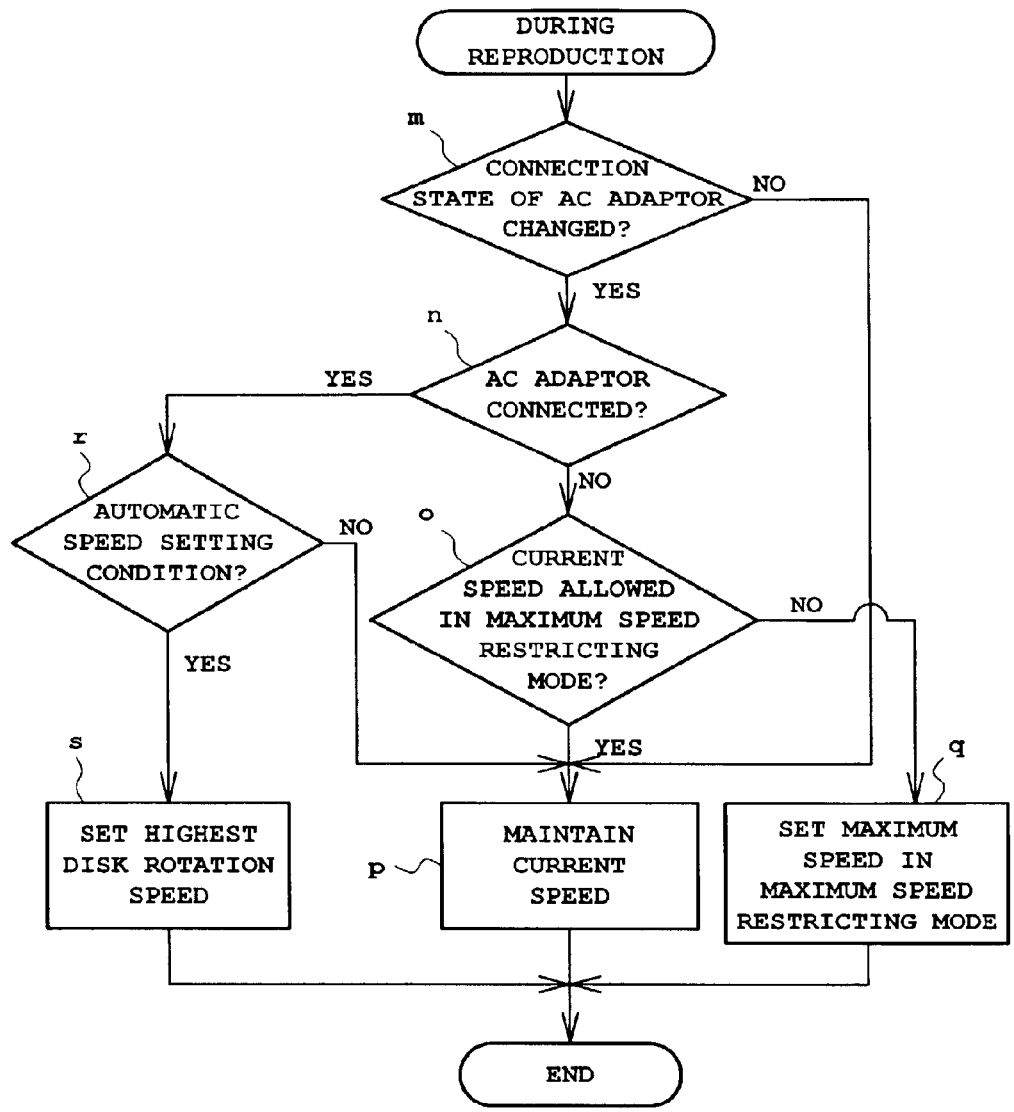
FIG. 4 is a flowchart for explaining an operation process when connection condition of an external power source in the form of an AC adaptor changes during data reproduction.

A case where the connection condition of an AC adaptor, as an example external power source, is changed during data reproduction will be described with reference to the flowchart shown in FIG. 4.

During data reproduction, the connecting power source detecting circuit 12 detects the connection state of the power source circuit 9 to determine whether or not the connection condition is changed (step m). When a change in the connection condition of the AC adaptor is detected, it is then determined whether or not the AC adaptor is connected (step n).

From the above two determination steps, it is determined that the power source is switched from the interface 1 or the battery to the AC adaptor, or vice versa.

When it is determined that the power source is switched from the AC adaptor to the interface 1 or the battery, it is then determined whether or not the disk rotation speed currently set can be achieved in the maximum speed restricting mode (step o).

When it is determined that the current disk rotation speed can be achieved in the maximum speed restricting mode, the current speed is maintained (step p). However, when the current disk rotation speed is a high speed which cannot be achieved in the maximum speed restricting mode, the current speed is automatically switched to the maximum speed that can be achieved in the maximum speed restricting mode. Simultaneously, the fact that the maximum speed in the maximum speed restricting mode is currently set is reported to the personal computer 2, which then operates in accordance with the newly set speed (step q).

At steps m and n, when it is determined that the power source is switched from the interface 1 or the battery to the AC adaptor, it is then determined whether or not an automatic speed setting condition is established in which the current rotation speed of the disk can be set by the speed control circuit 11, regardless of the maximum speed restricting mode set by the mode setting circuit 13 (step r).

Under this automatic speed setting condition, the current rotation speed is switched to the maximum disk rotation speed. Simultaneously, the fact the disk rotation speed is set to the maximum speed is reported to the personal computer 2, which then operates in accordance with the set speed (step s).

When the automatic speed setting condition is not established, on the other hand, the current rotation speed is maintained (step p).

Accordingly, during data reproduction, when the connecting power source is switched to the AC adaptor so that restriction of the data transfer rate due to power consumption considerations is released, the data processing speed is automatically switched to the maximum disk rotation speed, thereby achieving maximum speed reproduction performance.

In this case, the automatic speed setting condition can be optionally established, so that, when the connection of the AC adaptor is established, it is possible to prevent the disk rotation speed from being automatically set to the maximum speed when the current reproduction speed has been intentionally set, such as in consideration of reasons other than the power source conditions or because the user does not wish to change the current reproduction speed while data processing is ongoing.

As described above, according to the present embodiment, it is possible to provide a disk drive device in which, in accordance with the connection state of the external power source, the maximum disk rotation speed is restricted to a speed for which sufficient power as required for data processing can be supplied through the interface, thereby achieving both high speed data transfer and reduced power consumption. In particular, during data recording onto the disk, in a case where data processing is being performed at a speed corresponding to a data transfer rate for which sufficient power cannot be supplied through the interface and the connection to the external power source is interrupted, the data processing speed is switched to the maximum disk rotation speed corresponding to the data transfer rate at which sufficient power as required for data processing can be supplied from the interface. It is therefore possible to automatically switch, in accordance with a change in connection condition of the external power source, the data processing speed to a disk rotation speed at which a power shortage will not occur.

Further, during reproduction of data from the disk, when the connecting power source is switched to the external power source to thereby release the restriction state in which the data transfer rate is restricted because of power consumption considerations, it is possible to automatically switch the data processing speed to the maximum disk rotation speed, thereby achieving the maximum speed reproduction performance.

It should be noted that in the present embodiment, when the external power source is connected or disconnected during data recording or reproduction, only the rotation speed of the disk is changed and the mode is not changed. Accordingly, when the disk rotation speed becomes slower than the data transfer rate, buffer overflow occurs in which data is not written in the buffer RAM 4. During the buffer overflow, data reception is prohibited, and data transmission from the host device (personal computer 2) is halted. During this time, the data then stored in the buffer RAM 4 is processed and, when the data stored in the buffer RAM 4 reaches a predetermined amount, data transmission is resumed. Therefore, the data processing speed can be changed by varying only the rotation speed of the disk. When the disk rotation speed is faster than the data transfer rate, on the other hand, in spite of the fact that it is likely that buffer underrun would occur, data being transferred continued to be recorded on the disk.

While the preferred embodiment of the present invention has been described using specific terms, such description is for illustrative purposes only, and it is to be understood that changes and variations may be made without departing from the spirit or scope of the appended claims.

What is claimed is:

1. A disk drive device comprising:
   a speed control circuit for controlling the rotation speed of a disk installed in said disk drive device;
   an external power source connection detecting circuit for detecting connection of said external power source;
   a mode setting circuit for selectively establishing, in accordance with a detection output from the external power source connection detecting circuit, a maximum speed enabling mode in which the maximum disk rotation speed which can be achieved by a host device is not restricted or a maximum speed restricting mode in which said maximum disk rotation speed is restricted; and
   a buffer memory for temporarily storing data transferred from the host device;
   wherein, during data recording onto the disk, said mode setting circuit sets the rotation speed of the disk at the rotation speed which can be achieved in the maximum speed restricting mode when said external power source connection detecting circuit is unable to detect that the external power source is connected, and the possibility of buffer underrun in said buffer memory is detected because the speed of transfer of data from the host device is less than the speed of reading of data from said buffer memory.

2. A disk drive device according to claim 1, wherein during data recording onto the disk, said mode setting circuit determines the current rotation speed of the disk when said external power source connection detecting circuit detects that the external power source has been disconnected, and maintains the current rotation speed when the current rotation speed is one that can be achieved in the maximum speed restricting mode.

3. The disk drive device according to claim 1, wherein the host is connected via an interface capable of supplying power.

4. A disk drive device according to claim 3, wherein said interface is a USB (Universal Serial Bus) interface, provides a lower version compatibility enabling a lower communication speed and an upper version compatibility enabling a higher communication speed, and reports to said host device that the interface can adopt the upper version when said external power source connection detecting circuit detects the connection of the external power source and that the interface can adopt the lower version when said external power source connection detecting circuit does not detect the connection of the external power source.

5. The disk drive device according to claim 1, further comprising a system clock generating circuit for generating a system clock,
   wherein said speed control circuit controls the rotation speed of the disk by changing a system clock generated in said system clock generating circuit.

6. The disk drive device according to claim 5, further comprising a data processing circuit for processing data to be written onto the disk and data read from the disk, wherein said disk drive device operates based on a system clock generated in said system clock generating circuit.

7. The disk drive device according to claim 6, wherein the data processing circuit encodes the data supplied by the host.

8. The disk drive device according to claim 1, further comprising an optical head which performs data write and read to and from the disk.

9. A disk drive device comprising:

a speed control circuit for controlling the rotation speed of a disk installed in said disk drive device;

an external power source connection detecting circuit for detecting connection of said external power source;

a mode setting circuit for selectively establishing, in accordance with a detection output from the external power source connection detecting circuit, a maximum speed enabling mode in which the maximum disk rotation speed which can be achieved by a host device is not restricted or a maximum speed restriction mode in which said maximum disk rotation speed is restricted; and a buffer memory for temporarily storing data transferred from the host device;

wherein, during data reproduction on the disk, said mode setting circuit sets the rotation speed of the disk at a rotation speed which can be achieved in the maximum speed enabling mode when said external power source connection detecting circuit detects the connection of an external power source, and said mode setting circuit sets the rotation speed of the disk at the rotation speed which can be achieved in the maximum speed restricting mode when said external power source connection detecting circuit does not detect the connection of an external power source, and the possibility of buffer underrun in said buffer memory is detected because the speed of transfer of data from the host device is less than the speed of reading of data from said buffer memory.

10. A disk drive device according to claim 9, wherein an automatic speed setting condition in which the rotation speed of the disk can be set regardless of a mode set by said mode setting circuit can be established, and, under this automatic speed setting condition, the rotation speed of the disk is automatically switched to the maximum speed when said external power source connection detecting circuit detects that the connecting power source is switched to the external power source.

11. A disk drive device comprising:

means for controlling the rotation speed of a disk installed in said disk drive device;

an external power source connection detecting circuit for detecting connection of said external power source;

means for selectively establishing, in accordance with a detection output from the external power source connection detecting circuit, a maximum speed enabling mode in which the maximum disk rotation speed achieved by a host device is not restricted or a maximum speed restricting mode in which said maximum disk rotation speed is restricted; and a buffer memory for temporarily storing data transferred from the host device;

wherein, during data recording onto the disk, said means for selectively establishing sets the rotation speed of the disk at the rotation speed which can be achieved in the maximum speed restricting mode when said external power source connection detecting circuit is unable to detect that the external power source is connected and the possibility of buffer underrun in said buffer memory is detected because the speed of transfer of data from the host device is less than the speed of reading of data from said buffer memory.

12. The disk drive device according to claim 11, wherein the host is connected via an interface capable of supplying power.

13. The disk drive device according to claim 11, wherein said interface is a USB (Universal Serial Bus) interface, provides a lower version compatibility enabling a lower communication speed and an upper version compatibility enabling a higher communication speed, and reports to said host device that the interface can adopt the upper version when said external power source connection detecting circuit detects the connection of the external power source and that the interface can adopt the lower version when said external power source connection detecting circuit does not detect the connection of the external power source.

14. The disk drive device according to claim 11, wherein during data recording onto the disk, said means for selectively establishing determines the current rotation speed of the disk when said external power source connection detecting circuit detects that the external power source has been disconnected, and maintains the current rotation speed when the current rotation speed is one that can be achieved in the maximum speed restricting mode.

15. The disk drive device according to claim 11, further comprising a buffer memory for temporarily storing data transferred from the host device, wherein when, during data recording onto the disk, the possibility of buffer underrun in said buffer memory is detected because the speed of transfer of data from the host device is less than the speed of reading of data from said buffer memory, said mode setting circuit switches the rotation speed of the disk from its present speed to a rotation speed which can be achieved in the maximum speed restricting mode.

16. The disk drive device according to claim 11, further comprising a system clock generating circuit for generating a system clock, wherein said means for controlling controls the rotation speed of the disk by changing a system clock generated in said system clock generating circuit.

17. The disk drive device according to claim 16, further comprising a data processing circuit for processing data to be written onto the disk and data read from the disk, wherein said disk drive device operates based on a system clock generated in said system clock generating circuit.

18. The disk drive device according to claim 11, further comprising an optical head which performs date write and read to and from the disk.

19. A method for supplying power to a disk drive device comprising:

controlling the rotation speed of a disk installed in a disk drive device;

detecting connection of an external power source;

selectively establishing, in accordance with a detection output from the external power source connection detecting circuit, a maximum speed enabling mode in which the maximum disk rotation speed which can be achieved by a host device is not restricted or a maximum speed restricting mode in which said maximum disk rotation speed is restricted;

temporarily storing data transferred from the host device into a buffer memory;

wherein, during data recording onto the disk, setting the rotation speed of the disk at the rotation speed which can be achieved in the maximum speed restricting mode when not detecting that the external power source is connected and detecting the possibility of buffer underrun in said buffer memory because the speed of transfer of data from the host device is less than the speed of reading of data from said buffer memory.

* * * * *